United States Patent [19]
Park et al.

[11] Patent Number: 6,136,390
[45] Date of Patent: Oct. 24, 2000

[54] METHOD FOR MANUFACTURING A THIN FILM ACTUATABLE MIRROR ARRAY HAVING AN ENHANCED STRUCTURAL INTEGRITY

[75] Inventors: Myong-Hyun Park; Jin-Hun Kim; Hyoung-Jung Kim, all of Seoul, Rep. of Korea

[73] Assignee: Daewoo Electronics Co., Ltd., Seoul, Rep. of Korea

[21] Appl. No.: 08/984,179

[22] Filed: Dec. 3, 1997

[30] Foreign Application Priority Data

Dec. 11, 1996 [KR] Rep. of Korea ............. 96-64438
Dec. 27, 1996 [KR] Rep. of Korea ............. 96-74032
Aug. 29, 1997 [KR] Rep. of Korea ............. 97-43061

[51] Int. Cl.[7] .................. B05D 5/12; H05H 1/24; G02B 26/00
[52] U.S. Cl. ............ 427/579; 427/100; 427/103.3; 216/13; 216/67; 216/72; 359/295
[58] Field of Search ................... 427/579, 240, 427/100, 163.4, 162; 216/13, 18, 24, 63, 65, 67, 72; 310/328; 359/224, 290, 295, 846, 848, 849, 850, 855

[56] References Cited

U.S. PATENT DOCUMENTS

| | | | |
|---|---|---|---|
| 4,213,818 | 7/1980 | Lemons et al. | 438/719 |
| 5,247,222 | 9/1993 | Engle | 310/328 |
| 5,481,396 | 1/1996 | Ji et al. | 359/295 |
| 5,579,179 | 11/1996 | Ji et al. | 359/846 |
| 5,692,279 | 12/1997 | Mang et al. | 427/100 |
| 5,702,869 | 12/1997 | Chien et al. | 438/738 |
| 5,757,539 | 5/1998 | Min | 359/290 |
| 5,774,256 | 6/1998 | Min et al. | 359/291 |
| 5,786,928 | 7/1998 | Nam et al. | 359/295 |
| 5,789,290 | 8/1998 | Sun | 438/253 |
| 5,874,345 | 2/1999 | Coronel et al. | 438/427 |
| 5,877,889 | 3/1999 | Um et al. | 359/295 |
| 5,920,421 | 7/1999 | Choi | 395/291 |
| 5,920,422 | 7/1999 | Kim | 359/295 |

Primary Examiner—Marianne Padgett
Attorney, Agent, or Firm—Pennie & Edmonds LLP

[57] ABSTRACT

An inventive method for manufacturing an array of M×N thin film actuatable mirrors, the method being capable of preserving the structural integrity thereof, comprises the steps of: preparing an active matrix; depositing a passivation layer and an etchant stopping layer, successively, on top of the active matrix; forming a thin film sacrificial layer; depositing a first mask layer made of a silicon oxide; forming a second mask layer; forming an array of M×N pair of cavities, one of the cavities in each pair exposing a portion of one of the connecting terminals; removing the first and the second mask layer; forming an array of M×N actuating structures; removing the thin film sacrificial layer to thereby form the array of M×N thin film actuatable mirrors. During the formation of the cavities, the cavities is formed into a trapezoidal shape as a result of the difference in the etching rate between the first mask layer and the thin film sacrificial layer.

10 Claims, 10 Drawing Sheets

METHOD FOR MANUFACTURING A THIN FILM ACTUATABLE MIRROR ARRAY HAVING AN ENHANCED STRUCTURAL INTEGRITY

FIELD OF THE INVENTION

The present invention relates to an optical projection system; and, more particularly, to a method for manufacturing an array of M×N thin film actuatable mirrors for use in the system, the method being capable of enhancing the structural integrity of the thin film actuatable mirror.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuatable mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electric signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1I, there are illustrated a method for manufacturing an array 100 of M×N thin film actuatable mirrors 101, wherein M and N are integers, disclosed in a copending commonly owned application, U.S. Pat. No. 5,757,539, entitled "THIN FILM ACTUATED MIRROR ARRAY FOR USE IN AN OPTICAL PROJECTION SYSTEM".

Figure 1A:
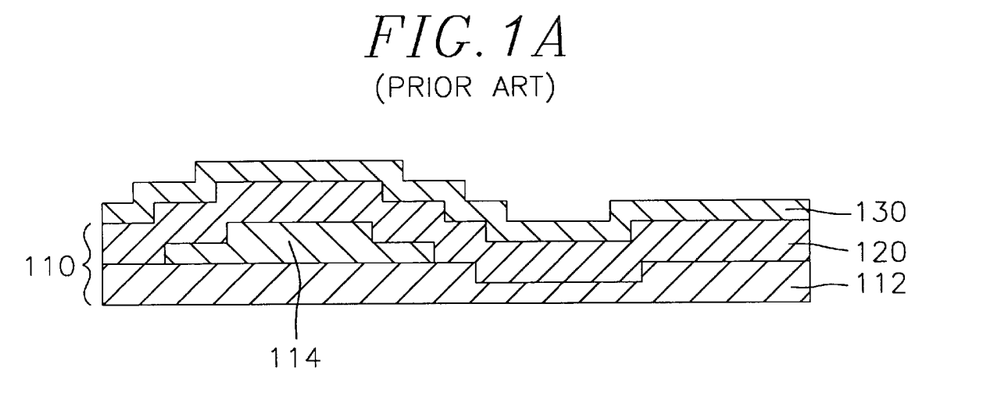
FIGS. 1A, 1B, 1C, 1D, 1E, 1F, 1G and 1H are schematic cross sectional views illustrating a method for the manufacture of an array of M×N thin film actuatable mirrors previously disclosed.

The process for the manufacture of the array 100 begins with the preparation of an active matrix 110 including a substrate 112, an array of M×N connecting terminals 114 and an array of M×N transistors (not shown). Each of the connecting terminals 114 is electrically connected to a corresponding transistor in the array of transistors.

In a subsequent step, there is formed a passivation layer 120, made of, e.g., phosphor silicate glass (PSG) or silicon nitride, and having a thickness of 0.1–2 μm, on top of the active matrix 110 by using, e.g., a chemical vapor deposition (CVD) or a spin coating method.

Thereafter, an etchant stopping layer 130, made of silicon nitride, and having a thickness of 0.1–2 μm, is deposited on top of the passivation layer 120 by using, e.g., a sputtering or a CVD method, as shown in FIG. 1A.

Figure 1B:
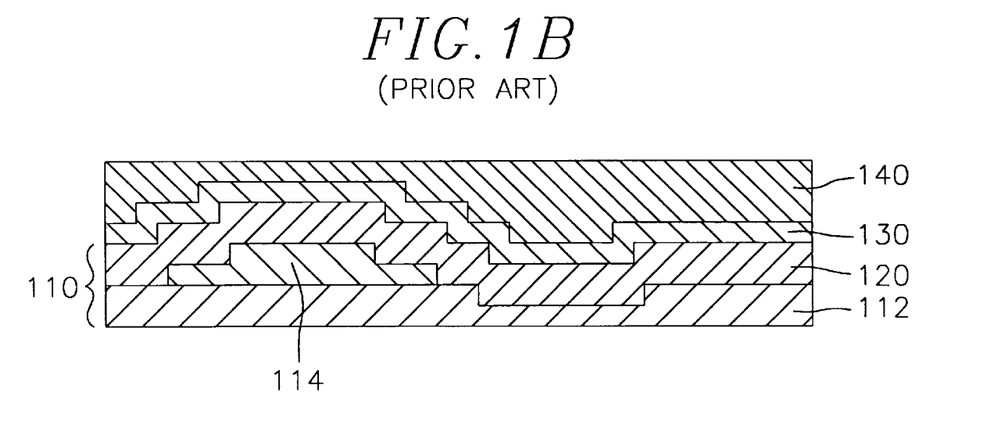

Then, a thin film sacrificial layer 140, made of, e.g., a PSG, and having a flat top surface, is formed on top of the etchant stopping layer 130 by using a CVD or spin coating method, followed by a chemical mechanical polishing (CMP) method, as shown in FIG. 1B.

Figure 1C:
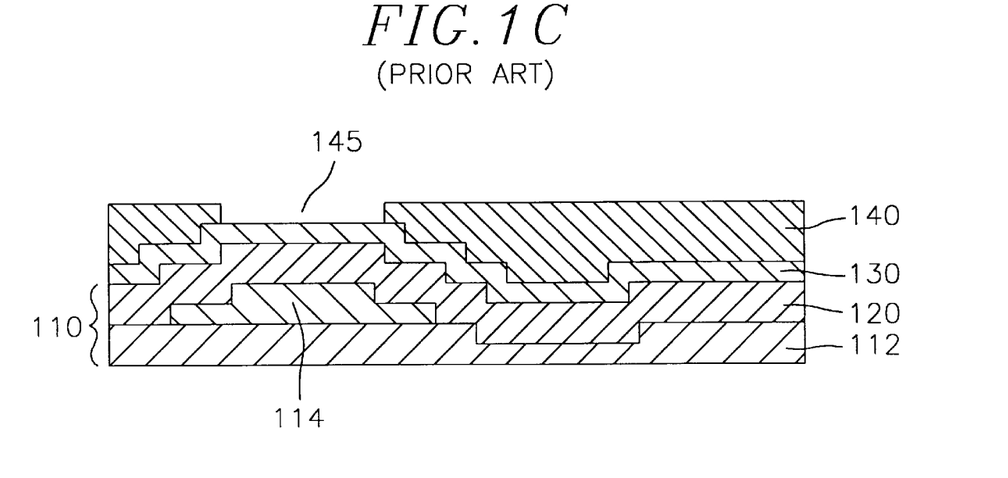

Subsequently, an array of M×N pairs of cavities 145 is created in the thin film sacrificial layer 140 in such a way that one of the cavities 145 in each pair encompasses one of the connecting terminals 114 by using a dry or an wet etching method, as shown in FIG. 1C.

Figure 1D:
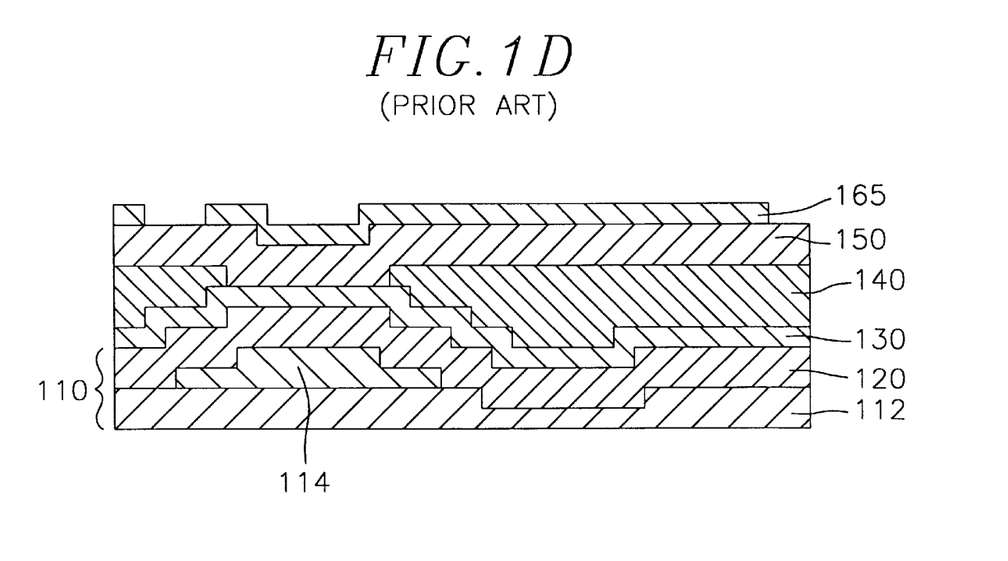

In a next step, a supporting layer 150, made of a nitride, e.g., silicon nitride, and having a thickness of 0.1–2 μm, is deposited on top of the thin film sacrificial layer 140 including inside the cavities 145 by using a CVD method.

Thereafter, a second thin film layer (not shown), made of an electrically conducting material, e.g., platinum/tantalum (Pt/Ta), and having a thickness of 0.1–2 μm, is formed on top of the supporting layer 150 by using a sputtering or a vacuum evaporation method. The second thin film layer is then patterned into an array of M×N second thin film electrodes 165 by using a dry etching method, wherein each of the second thin film electrodes 165 is electrically disconnected from other second thin film electrodes 165, as shown in FIG. 1D.

Figure 1E:
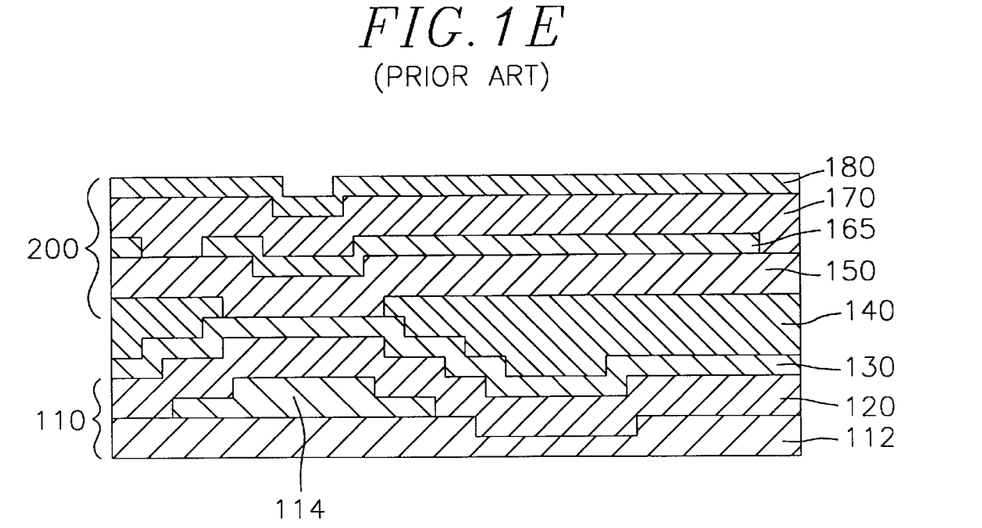

Then, a thin film electrodisplacive layer 170, made of a piezoelectric material, e.g., lead zirconium titanate (PZT), or an electrostrictive material, e.g., lead magnesium niobate (PMN), and having a thickness of 0.1–2 μm, is deposited on top of the array of M×N second thin film electrodes 165 by using an evaporation, a Sol-Gel, a sputtering or a CVD method. The thin film electrodisplacive layer 170 is then heat treated to allow a phase transition to take place by using a rapid thermal annealing (RTA) method.

Subsequently, a first thin film layer 180, made of an electrically conducting and light reflecting material, e.g., aluminum (Al) or silver (Ag), and having a thickness of 0.1–2 μm, is formed on top of the thin film electrodisplacive layer 170 by using a sputtering or a vacuum evaporation method, thereby forming a multiple layered structure 200, as shown in FIG. 1E.

Figure 1F:
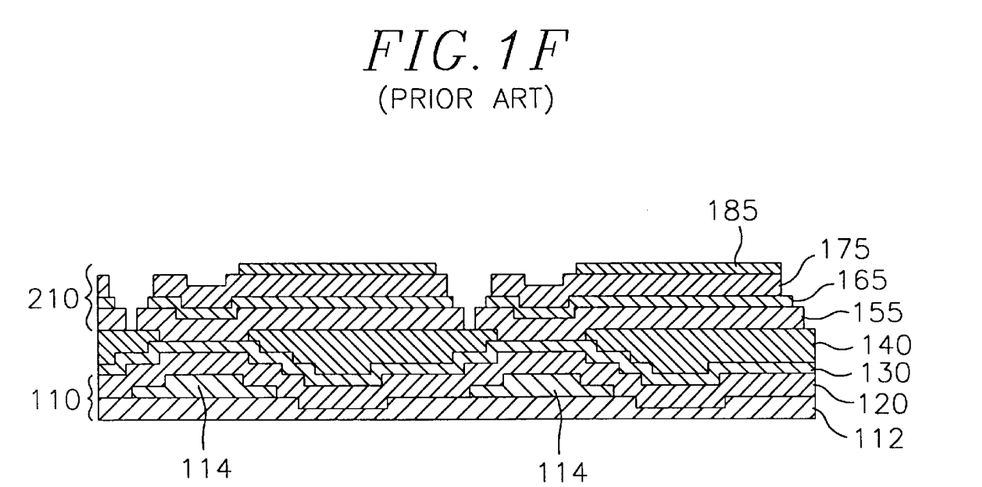

In an ensuing step, as shown in FIG. 1F, the multiple layered structure 200 is patterned into an array of M×N semifinished actuating structures 210 by using a photolithography or a laser trimming method, until the thin film sacrificial layer 140 is exposed, in such a way that each of the semifinished actuating structures 210 includes a first thin film electrode 185, a thin film electrodisplacive member 175, the second thin film electrode 165 and a supporting member 155.

Figure 1G:
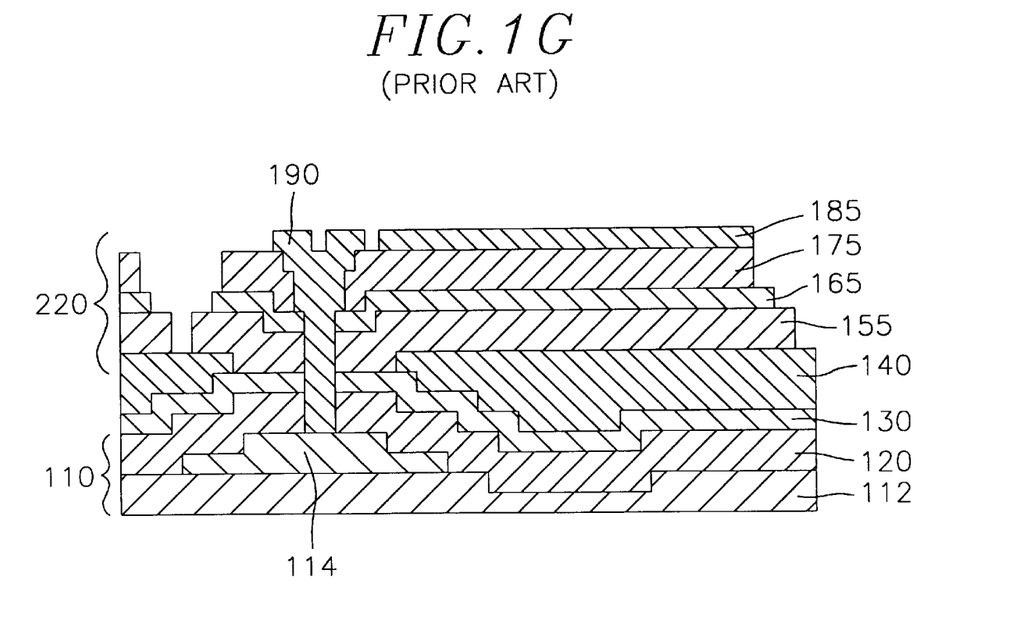

In a subsequent step, an array of M×N conduits 190, made of, e.g., tungsten (W), is formed by using a lift-off method, wherein each of the conduits 190 is extended from top of the thin film electrodisplacive member 175 to top of a corresponding connecting terminal 114, thereby forming an array of M×N actuating structures 220, as shown in FIG. 1G.

Figure 1H:
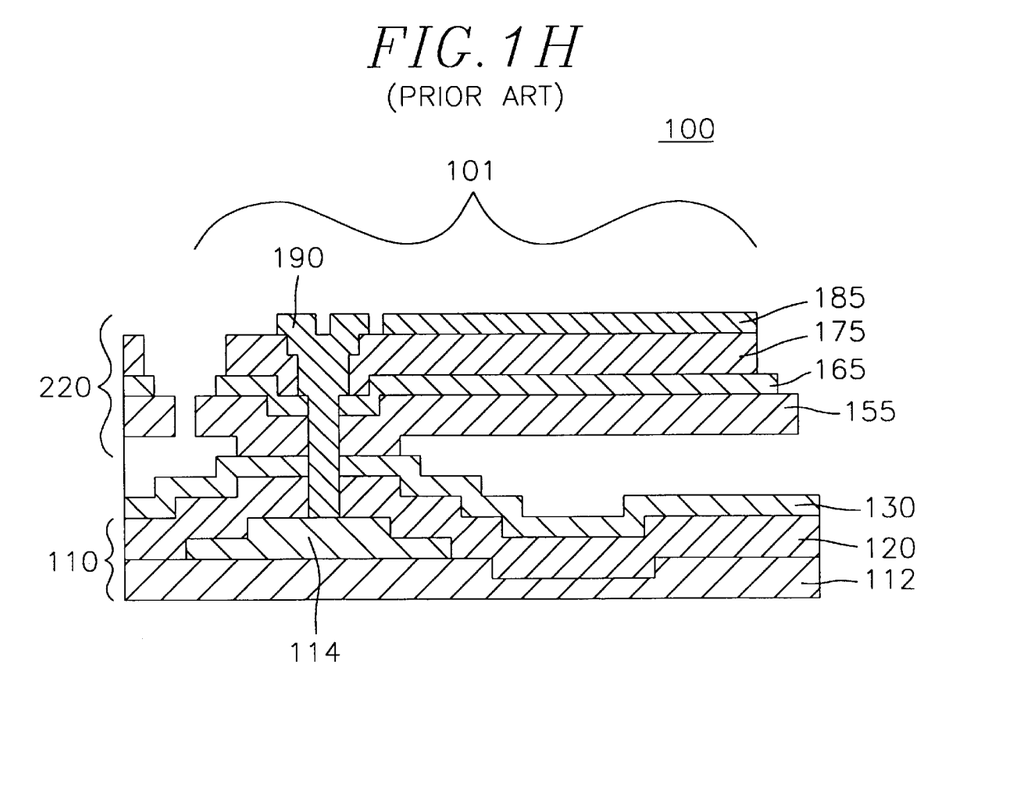

Finally, the thin film sacrificial layer 140 is then removed by using an wet etching method using an etchant or a chemical, e.g., hydrogen fluoride (HF) vapor to thereby form an array 100 of M×N thin film actuatable mirrors 101, as shown in FIG. 1H.

There are certain deficiencies associated with the above described method for the manufacture of the array 100 of M×N thin film actuatable mirrors 101. The cavities 145 are, generally, formed into a rectangular shape by etching the thin film sacrificial layer 140 using a photoresist. As a consequence of the presence of the cavities, the thin film layers subsequently over layered on top of the sacrificial layer after the cavities are formed are not planar; they are provided with steps with sharp edges at the portions thereof coinciding with the cavities. The stress is concentrated at the sharp edges of the steps of the thin film electrodisplacive layer 170 coinciding with the cavities 145, the stress causing cracks to be formed when the thin film electrodisplacive layer 170 is heat treated to allow the phase transition to take place, which, in turn, deterimentally affects the structural integrity of the thin film actuatable mirror 101.

SUMMARY OF THE INVENTION

It is, therefore, a primary object of the present invention to provide a method for manufacturing an array of M×N thin film actuatable mirrors, the method being capable of preserving the structural integrity of the thin film actuated mirrors.

In accordance with an aspect of the present invention, there is provided a method for manufacturing an array of M×N thin film actuatable mirrors, wherein M and N are integers, for use in an optical projection system, the method comprising the step of: preparing an active matrix including a substrate and an array of M×N connecting terminals; depositing a passivation layer, an etchant stopping layer and a thin film sacrificial layer on top of the active matrix, successively; depositing a first mask layer made of, e.g., a silicon oxide, on top of the thin film sacrificial layer; forming a second mask layer made of, e.g., a photoresist, on top of the first mask layer; etching the first mask layer and the thin film sacrificial layer to thereby form an array of M×N pairs of empty cavities having a trapezoidal shape; removing the second mask layer and the first mask layer; depositing an elastic layer and a second thin film layer on top of the thin film sacrificial layer including the empty cavities, successively; iso-cutting the second thin film layer into an array of M×N second thin film electrodes; depositing a thin film electrodisplacive layer and a first thin film layer on top of the second thin film electrodes, thereby forming a multiple layered structure; patterning the multiple layered structure into an array of M×N semifinished actuating structures, until the thin film sacrificial layer is exposed; forming an array of M×N conduits, each of the conduits extending from top of the thin film electrodisplacive member to top of a corresponding connecting terminal to thereby form an array of M×N actuating structures; removing the thin film sacrificial layer to thereby form the array of M×N thin film actuatable mirrors.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

There are provided in FIGS. 2A to 2L cross sectional views illustrating a method for manufacturing an array 300 of M×N thin film actuatable mirrors 301, wherein M and N are integers, for use in an optical projection system in accordance with the present invention, the method being capable of preserving the structural integrity of the thin film actuatable mirrors 301. It should be noted that like parts appearing in FIGS. 2A to 2L are represented by like reference numerals.

Figure 2A:
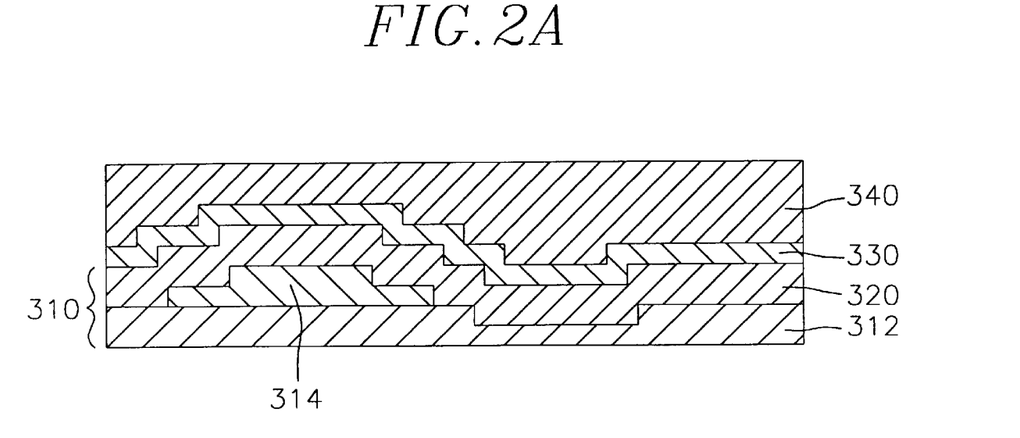
FIGS. 2A, 2B, 2C, 2D, 2E, 2F, 2G, 2H, 2I, 2J, 2K, and 2L are schematic cross sectional views illustrating a method for manufacturing the array of M×N thin film actuatable mirrors in accordance with the present invention.

The process for the manufacture of the array 300 begins with the preparation of an active matrix 310 including a substrate 312 and an array of M×N connecting terminals 314.

In a subsequent step, there is formed a passivation layer 320, made of, e.g., PSG, and having a thickness of 0.1–2 $\mu$m, on top of the active matrix 310 by using, e.g., a chemical vapor deposition (CVD) method.

Thereafter, an etchant stopping layer 330, made of silicon nitride, and having a thickness of 1000–2000 Å, is deposited on top of the passivation layer 320 by using, e.g., a low pressure chemical vapor deposition (LPCVD) method.

Then, a thin film sacrificial layer 340, made of PSG and having a thickness of 0.5–4 $\mu$m, is formed on top of the etchant stopping layer 330 by using an atmospheric pressure chemical vapor deposition (APCVD) method, followed a CMP method, as shown in FIG. 2A.

Figure 2B:
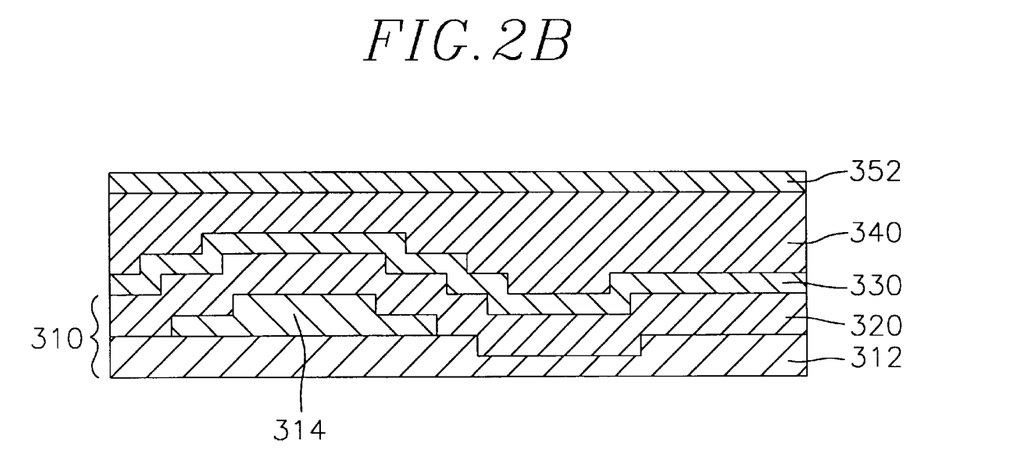

In a subsequent step, a first mask layer 352, made of, e.g., silicon dioxide ($SiO_2$), and having a thickness of 500–1000 Å, is deposited on top of the thin film sacrificial layer 340 by using a plasma enhanced chemical vapor deposition (PECVD) method at a temperature less than 400° C., as shown in FIG. 2B.

Figure 2C:
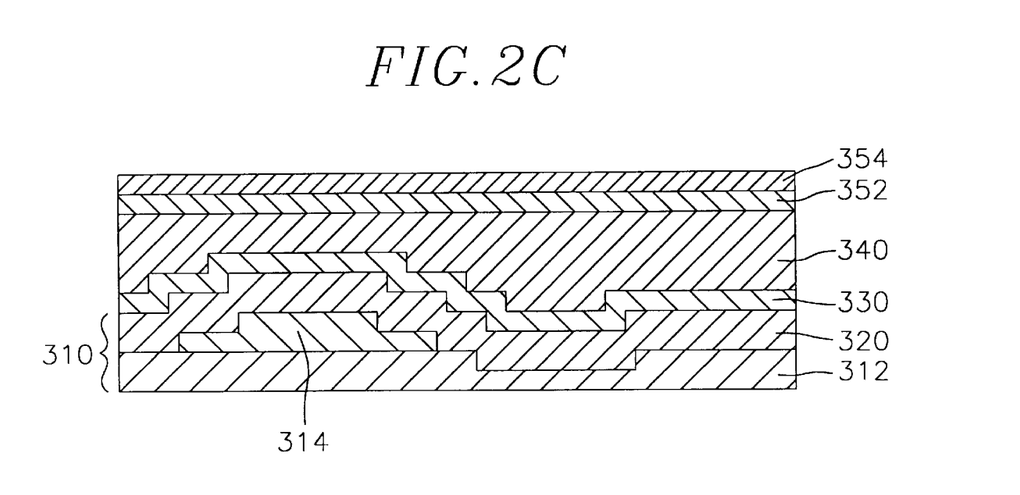

Subsequently, a second mask layer 354, made of, e.g., a photoresist, and having a thickness of 500–1000 Å, is deposited on top of the first mask layer 352 by using a spin coating method, as shown in FIG. 2C.

Figure 2D:
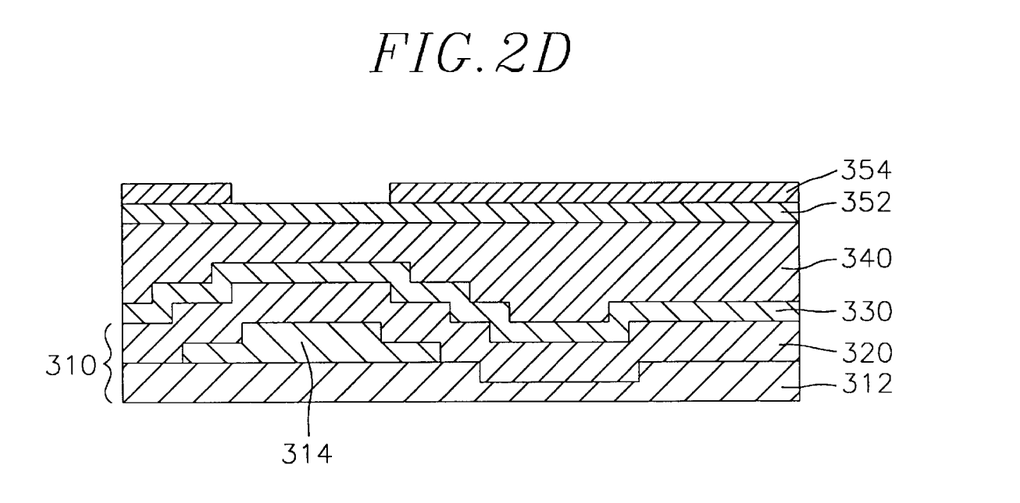

Next, the second mask layer 354 is selectively etched by using an etching method, as shown in FIG. 2D.

Figure 2E:
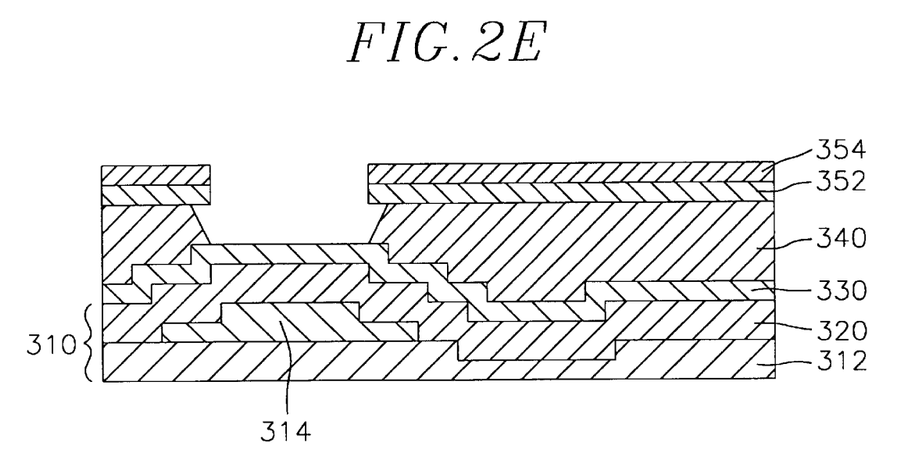

Thereafter, the first mask layer 352 and the thin film sacrificial layer 340 are etched by using a dry etching method, thereby forming an array of M×N pair of cavities 345, wherein each of the cavities 345 is formed into a trapezoidal shape as a result of the difference in the etching rate between the first mask layer 352 and the thin film sacrificial layer 340, as shown in FIG. 2E.

Figure 2F:
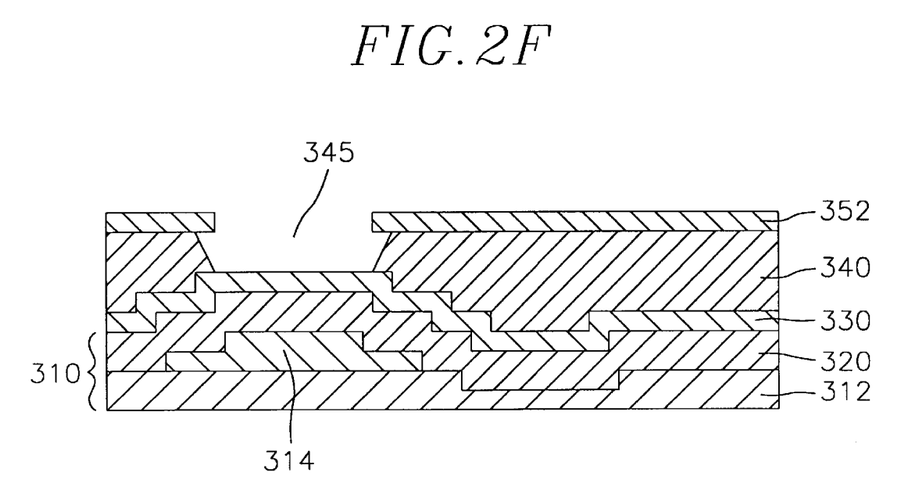

In an ensuing step, the second mask layer 354 is removed by using an ashing method, as shown in FIG. 2F.

Figure 2G:
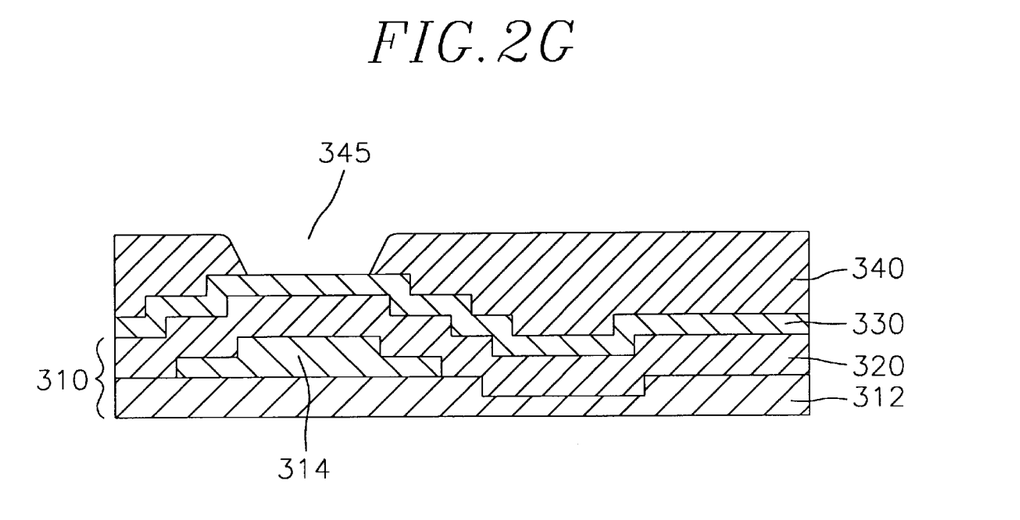

In a next step, the first mask layer 352 is removed by using an wet etching method, wherein the angle portion of the cavities 345 formed as the trapezoidal shape is rounded by the subsequential etching process, as shown in FIG. 2G.

Figure 2H:
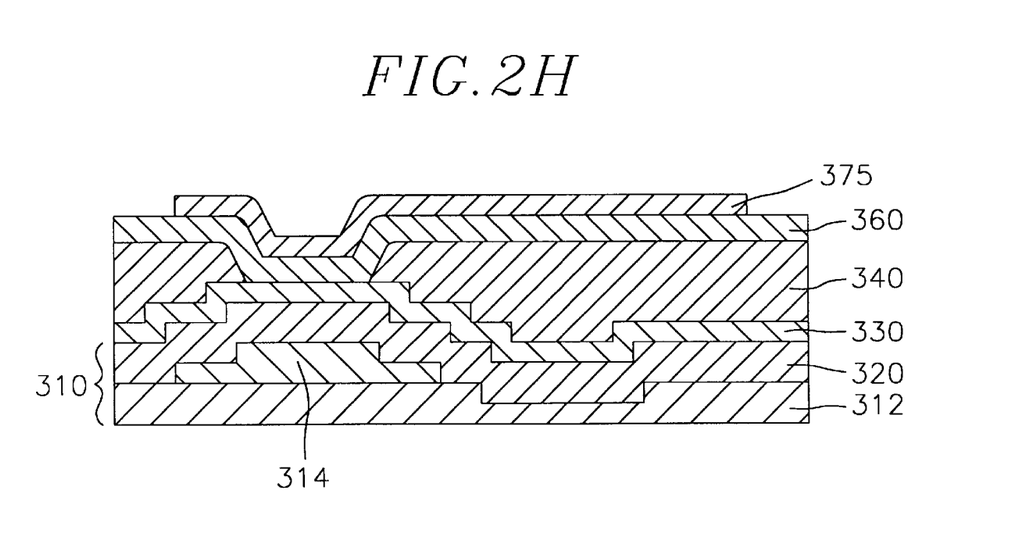

In a subsequent step, a supporting layer 360, made of a nitride, e.g., silicon nitride, and having a thickness of 0.1–1 $\mu$m, is deposited on top of the thin film sacrificial layer 340 including inside the cavities 345 by using a LPCVD method.

Thereafter, a second thin film layer (not shown), made of an electrically conducting material, e.g., platinum/tantalum (Pt/Ta), and having a thickness of 0.1–1 $\mu$m, is formed on top of the supporting layer 360 by using a sputtering method. The second thin film layer is then patterned into an array of M×N second thin film electrodes 375 by using a dry etching method, wherein each of the second thin film electrodes 375 is electrically disconnected from other second thin film electrodes 375, as shown in FIG. 2H.

Figure 2I:
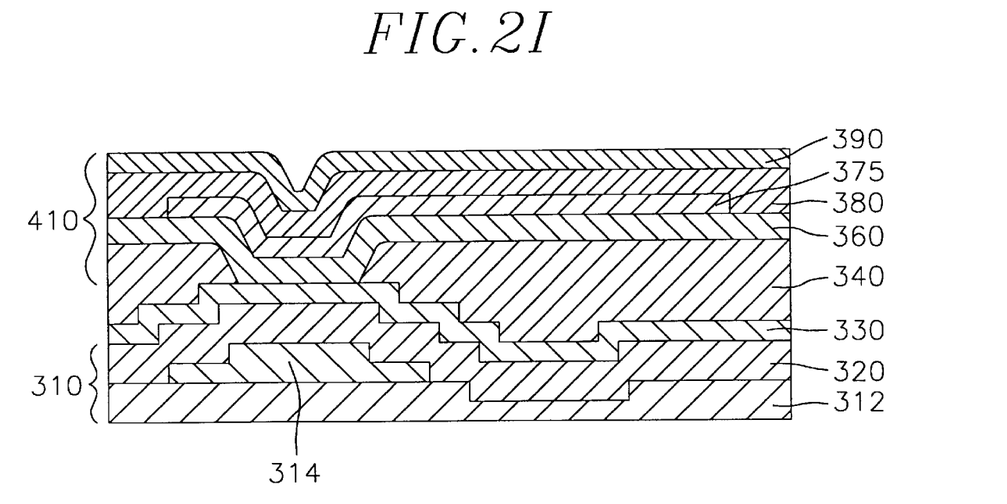

Then, a thin film electrodisplacive layer 380, made of a piezoelectric material, e.g., lead zirconium titanate (PZT), or an electrostrictive material, e.g., PMN, and having a thickness of 0.1–1 $\mu$m, is deposited on top of the array of M×N second thin film electrodes 375 by using an evaporation, a Sol-Gel, a sputtering or a CVD method. The thin film electrodisplacive layer 380 is then heat treated to allow a phase transition to take place by using a rapid thermal annealing (RTA) method.

Subsequently, a first thin film layer 390, made of an electrically conducting and light reflecting material, e.g., aluminum (Al) or silver (Ag), and having a thickness of 0.1–1 μm, is formed on top of the thin film electrodisplacive layer 380 by using a sputtering method, thereby forming a multiple layered structure 410, as shown in FIG. 2I.

Figure 2J:
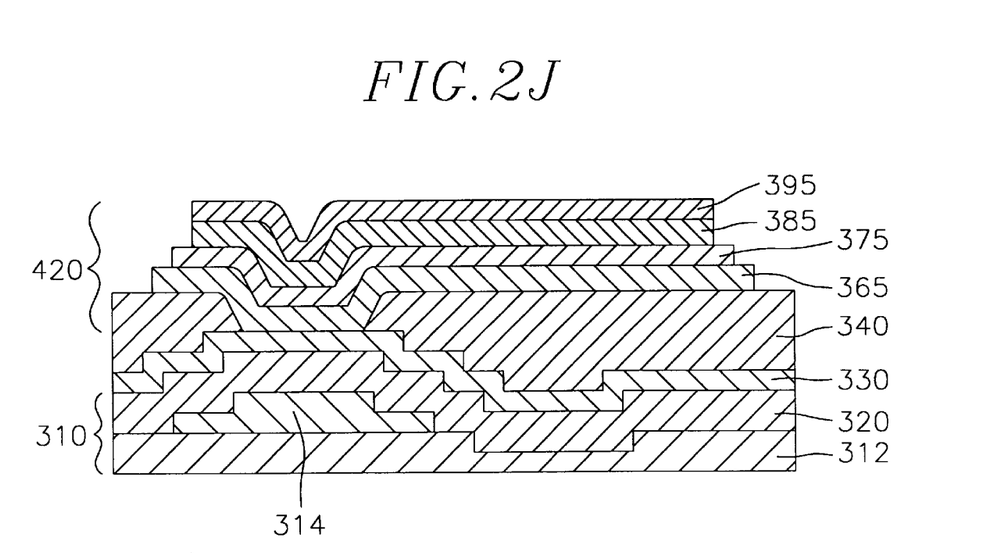

In an ensuing step, as shown in FIG. 2J, the multiple layered structure 410 is patterned into an array of M×N semifinished actuating structures 420 by using a photolithography or a laser trimming method, until the thin film sacrificial layer 340 is exposed. Each of the semifinished actuatable structures 420 includes a first thin film electrode 395, a thin film electrodisplacive member 385, the second thin film electrode 375 and a supporting member 365.

Figure 2K:
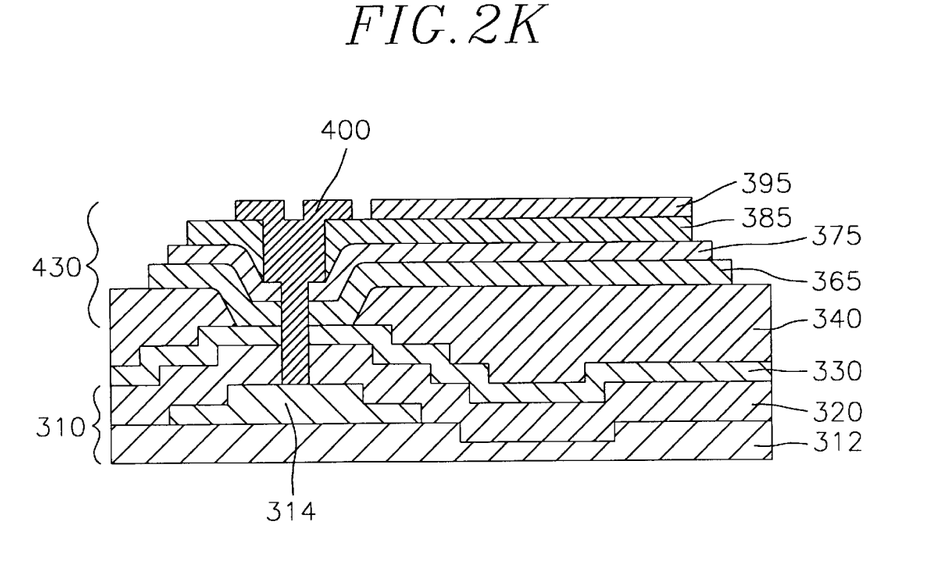

In a subsequent step, an array of M×N holes (not shown) is created by using an etching method, wherein each of the holes extends from top of the thin film electrodisplacive member 385 to top of a corresponding connecting terminal 314. There is then formed an array of M×N vias 400 by filling each of the holes with a metal, e.g., tungsten (W), thereby forming an array of M×N actuating structures 430, as shown in FIG. 2K.

Figure 2L:
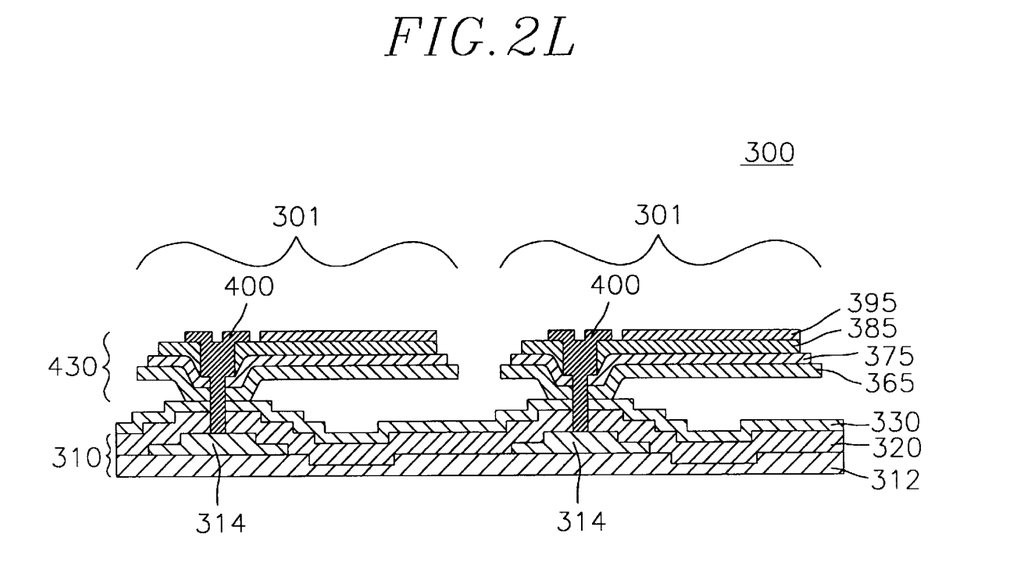

Finally, the thin film sacrificial layer 340 is removed by using an wet etching method using an etchant or a chemical, e.g., hydrogen fluoride (HF) vapor, to thereby form the array 300 of M×N thin film actuatable mirrors 301, as shown in FIG. 2L.

In the inventive method for manufacturing the array 300 of M×N thin film actuatable mirrors 301, the first mask layer 352 is formed on top of the thin film sacrificial layer 340, prior to the formation of the second mask layer 354 made of, e.g., a photoresist. In order to form the cavities 345 by etching the first mask layer 352 made of, e.g., a silicon oxide, and the thin film sacrificial layer 340 made of, e.g., a PSG, each of the empty cavities 345 is formed into a trapezoidal shape as a result of the difference in the etching rate between the first mask layer 352 and the thin film sacrificial layer 340. Furthermore, during the removal of the first mask layer 352, edges of the cavities 345 are rounded by the subsequential etching process, which, in turn, prevents the cracks from forming during the subsequent RTA of the thin film electrodisplacive layer 370.

While the present invention has been described with respect to certain preferred embodiments only, other modifications and variations may be made without departing from the spirit and scope of the present invention as set forth in the following claims.

What is claimed is:

1. A method for manufacturing an array of M×N thin film actuatable mirrors, wherein M and N are integers, for use in an optical projection system, the method comprising the steps of:

preparing an active matrix including a substrate and an array of M×N connecting terminals;

depositing successively a passivation layer, an etchant stopping layer and a thin film sacrificial layer on top of the active matrix, respectively;

depositing a first mask layer on top of the thin film sacrificial layer;

forming a second mask layer on top of the first mask layer;

etching the first mask layer and the thin film sacrificial layer, selectively, thereby creating an array of M×N pairs of trapezoid-shaped cavities in the thin film sacrificial layer, one of the cavities in each pair exposing a portion of one of the connecting terminals;

removing the second mask layer;

removing the first mask layer, thereby causing the cavities to have rounded top edges;

forming an array of M×N actuating structures on top of the thin film sacrificial layer, each of the actuating structures including a supporting member, a second thin film electrode, a thin film electrodisplacive layer, and a first thin film electrode and a via, the first thin film electrode being of made of a light reflecting and electrically conducting material, thereby allowing it to function as an electrode and a mirror, wherein each of the actuating structures deforms in response to an electrical signal applied from the corresponding terminal through the via between the second thin film electrode and the first thin film electrode with the first thin film electrodisplacive layer disposed therebetween; and removing the thin film sacrificial layer to thereby form the array of M×N thin film actuatable mirrors.

2. The method of claim 1, wherein the first mask layer is made of silicon oxide.

3. The method of claim 1, wherein the second mask layer is made of a photoresist.

4. The method of claim 1, wherein the first mask layer is deposited by using a plasma enhanced chemical vapor deposition (PECVD).

5. The method of claim 1, wherein the first mask layer is deposited at a temperature less than 400° C.

6. The method of claim 5, the first mask layer has a thickness of 500–1000 Å.

7. The method of claim 1, wherein the second mask layer is removed by using an ashing method.

8. The method of claim 1, wherein the first mask layer is removed by using a dry etching method.

9. A method for manufacturing an array of M×N thin film actuatable mirrors for use in an optical projection system, the method comprising the steps of:

preparing an active matrix including a substrate and an array of M×N connecting terminals;

depositing a passivation layer, an etchant stopping layer and a thin film sacrificial layer on top of the active matrix, respectively;

depositing a first mask layer on top of the thin film sacrificial layer;

depositing a second mask layer on top of the first mask layer;

etching the second mask layer, selectively;

etching the first mask layer and the thin film sacrificial layer, selectively, to thereby form an array of M×N pair of trapezoid-shaped cavities;

removing the second mask layer;

removing the first mask layer, thereby causing the cavities to have rounded top edges;

depositing a supporting layer and a second thin film layer on top of the thin film sacrificial layer, respectively;

depositing a thin film electrodisplacive layer and a first thin film layer on top of the second thin film layer, successively, to thereby form a multiple layered structure;

patterning the multiple layered structure into an array of M×N semifinished actuatable structures, until the thin film sacrificial layer is exposed, each of the semifinished actuatable structures including a first thin film electrode, a thin film electrodisplacive member, a second thin film electrode, a supporting member;

forming an array of M×N vias for connecting the second thin film electrode to thereby form an array of M×N actuating structures, each of the vias extending from top of the thin film electrodisplacive member to top of the corresponding connecting terminal; and removing the thin film sacrificial layer to thereby form the array of M×N thin film actuatable mirrors.

10. The method of claim 9, wherein the second mask layer is formed by using a spin-coating method.

* * * * *